United States Patent
Glemza et al.

(10) Patent No.: US 6,670,302 B2
(45) Date of Patent: Dec. 30, 2003

(54) HIGH PORE VOLUME POLYOLEFIN CATALYST

(75) Inventors: Rimantas Glemza, Baltimore, MD (US); Dean A. Denton, Baltimore, MD (US)

(73) Assignee: W. R. Grace & Co.-Conn, Columbia, MD (US)

(*) Notice: Subject to any disclaimer, the term of this patent is extended or adjusted under 35 U.S.C. 154(b) by 0 days.

(21) Appl. No.: 10/285,035

(22) Filed: Oct. 31, 2002

(65) Prior Publication Data

US 2003/0065112 A1 Apr. 3, 2003

Related U.S. Application Data

(62) Division of application No. 08/970,277, filed on Nov. 14, 1997, now abandoned.

(51) Int. Cl.[7] .................................................. B01J 21/08
(52) U.S. Cl. .................... 502/233; 502/234; 502/103; 526/104; 526/129; 526/348; 526/106
(58) Field of Search ................................ 502/233, 234, 502/103; 526/104, 129, 348, 106

(56) References Cited

U.S. PATENT DOCUMENTS

| 2,232,727 A | 2/1941 | Peterkin ........................ 23/110 |
| 2,385,217 A | 9/1945 | Marisic ......................... 252/317 |
| 2,825,721 A | 3/1958 | Hogan et al. ................. 260/88.1 |
| 2,951,816 A | 9/1960 | Hogan et al. ................. 252/467 |
| 3,567,645 A | 3/1971 | Dultz ............................ 252/194 |
| 3,652,214 A | 3/1972 | Aboutboul et al. ............ 23/182 |
| 3,652,215 A | 3/1972 | Aboutboul et al. ............ 23/182 |
| 3,652,216 A | 3/1972 | Krekeler et al. ............... 23/182 |
| 3,872,217 A | 3/1975 | Merz et al. ................... 423/338 |
| 3,887,494 A | 6/1975 | Dietz ............................ 252/452 |
| 3,900,457 A | 8/1975 | Witt ............................. 260/94.9 |
| 3,960,826 A | 6/1976 | Aboutboul et al. ........... 526/103 |
| 3,974,101 A * | 8/1976 | Witt ............................. 252/458 |
| 4,234,453 A | 11/1980 | Rekers et al. ................ 252/428 |
| 4,404,340 A | 9/1983 | Speca et al. .................. 526/97 |
| 4,472,531 A | 9/1984 | Speca et al. .................. 502/256 |
| 5,284,926 A | 2/1994 | Benham et al. ............... 526/98 |
| 5,576,263 A | 11/1996 | Badley et al. ................ 502/237 |

FOREIGN PATENT DOCUMENTS

| CA | 759914 | 5/1967 | ................. 134/53 |
| FR | 2111169 | 6/1972 | ............ B01J/11/00 |
| JP | 48-13834 | * 5/1973 | |

OTHER PUBLICATIONS

American Society for Testing and Materials, ASTM D 1238–79, "Flow Rates of Thermoplastics by Extrusion Plastometer".

* cited by examiner

Primary Examiner—Ling-Siu Choi
(74) Attorney, Agent, or Firm—Howard Troffkin; Robert Maggio

(57) ABSTRACT

High melt index polyolefins have been obtained with chromium silica catalysts under conventional polymerization conditions without the use of titanium or other additives. The useful chromium silica catalysts have a pore volume in the range of 1.9–2.9 cc/g and a narrow pore size distribution. The silica is a silica gel preferably obtained from a low solids, rapid gelation process.

12 Claims, No Drawings

HIGH PORE VOLUME POLYOLEFIN CATALYST

This is a division of application Ser. No. 08/970,277, filed Nov. 14, 1997, now abandoned.

BACKGROUND OF THE INVENTION

In the field of manufacture of polyolefins (e.g. polyethylene), much attention has been devoted to finding new and improved catalysts capable of producing olefin polymers having improved properties.

For many applications, it is desirable to produce polyolefins having high melt flow index property. In the past, it has been found that high melt index was not achievable by use of simple chromium-silica catalysts. Therefore, producers of polyolefins turned to the use of titanium-containing catalysts such as Ti—Cr-silica tergel or Ziegler-Natta catalysts. These alternatives to chromium-silica catalysts are generally more expensive than chromium-silica catalysts. Further, Ziegler catalysts are often difficult to obtain in a supported form. Also, Ziegler catalysts can result in the introduction of undesirable amounts of chlorine (and other constituents) into the polyolefin.

Attempts have been made to increase the melt index obtainable using chromium silica catalysts by use of high pore volume silica gels or by adding other substances to the gel such as phosphorus-containing additives. The success of these attempts has been very limited. Accordingly, there remains a need for alternative catalysts capable of producing high melt index polyolefins without the above-mentioned disadvantages.

SUMMARY OF THE INVENTION

The invention provides new chromium silica catalysts which are capable of achieving high melt index polyolefins without the use of titanium or other additives. The catalysts of the invention are capable of achieving melt index in excess of 4.0 as measured by ASTM D1238-79, Condition E, Procedure B. The invention also encompasses methods for making the catalysts of the invention.

In one aspect, the invention encompasses catalyst compositions suitable for polymerization of olefins wherein the catalysts comprise:

(a) an amorphous silica gel support having a pore volume of 1.9–2.9 cc/g, a surface area of about 250–900 m$^2$/g, and a pore size distribution wherein at least 40% of the pores have a pore size of about 200–400 Å, and (b) chromium, wherein the catalyst is capable of yielding a polyolefin material having (1) a melt flow index of at least about 4.0 in a slurry polymerization of ethylene wherein the catalyst composition is the only catalyst employed, the melt flow index being determined by ASTM D1238-79, Condition E, Procedure B.

In another aspect, the invention the invention encompasses a process for manufacture of a chromium-containing silica catalyst, the process comprising:

(a) combining an alkali metal silicate solution and a mineral acid to form a mixture having pH of 6–10 and a silica content of about 16–21 wt. % and maintaining the mixture at a temperature of about 10–20° C., (b) forming the mixture into beads and rapidly gelling the beads, (c) washing the gelled beads in an aqueous bath at pH=3–6 for about 15–30 hours, (d) aging the beads in an alkaline bath of pH=8–10 for about 5–25 hours, (e) immersing the washed aged beads in an organic solvent suitable for azeotropic distillation and removing water from the beads by azeotropic distillation, (f) drying the beads.

A chromium compound may be added to the mixture to be gelled, to the gelled beads before or during step (e) or to the dried beads. Preferably, the beads are formed by injecting the mixture into air. The beads preferably gel instantaneously when they are formed.

These and other aspects of the invention are described in further detail below.

DETAILED DESCRIPTION OF THE INVENTION

The invention encompasses the discovery that certain silica gels when used in chromium silica catalysts result in a capability of producing high melt index polyolefins. The invention further encompasses the discovery of processes for making these chromium silica catalysts.

The silicas useful in the invention are characterized by a combination of high pore volume, moderately high average pore diameter and narrow pore size distribution. The silicas of the invention are believed to be primarily produced by instantaneous gelation processes, and more particularly by so-called bead gel processes.

The silica gels and chromium silica catalysts of the invention are preferably have a pore volume of at least about 1.9–2.9 cc/g, more preferably about 2.2–2.7 cc/g. The gels and catalysts are further characterized by an average pore size of preferably about 200–500 Å, more preferably about 250–350 Å. The silica gels and resulting catalysts preferably have a pore size distribution wherein at least 40% of the pores have a pore size of 200–400 Å, more preferably about 50–70% of the pores have a pore size of 250–350 Å. Preferably, the silica gels and resulting catalysts have at least about 80% of total surface area in pores above 140 Å; more preferably at least 95% of total surface area in pores 150–450 Å range where the pore size distribution is measured by Nitrogen Desorption (BET) Method.

The catalysts of the invention comprise chromium and silica. The catalysts may contain other additives, however the catalysts preferably consist essentially of chromium and silica. In any event, the catalysts preferably do not contain titanium.

The chromium silica catalysts of the invention may contain any catalytically effective amount of chromium. Preferably, the amount of chromium is about 0.1–2.0 wt. % based on the total weight of the catalyst, more preferably about 0.5–1.3 wt. %. The average particle size of the catalyst is preferably about 30–300 microns, more preferably about 80–150 microns.

The catalysts of the invention are further characterized by their ability to achieve a melt flow index of at least about 4.0, more preferably about 5–7 as measured by ASTM D1238-79, Condition E, Procedure B. The above mentioned properties are measured with respect to polymerization of ethylene in a slurry polymerization process.

The chromium silica catalysts of the invention are preferably made using a modified bead gel process. The process preferably comprises:

(a) combining an alkali metal silicate solution and a mineral acid to form a mixture having pH of 6–10 and a silica content of about 16–21 wt. % and maintaining the mixture at a temperature of about 10–20° C., (b) forming the mixture into beads and rapidly gelling the beads, (c) washing the gelled beads in an aqueous bath at pH=3–6 for about 15–30 hours, (d) aging the beads in an alkaline bath of pH=8–10 for about 5–25 hours, (e) immersing the washed aged beads in an organic solvent suitable for azeotropic distillation and removing water from the beads by azeotropic distillation, and (f) drying the beads.

A chromium compound may be added to the mixture to be gelled, to the gelled beads before or during step (e), or to the dried beads.

The alkali silicate is preferably a sodium silicate. The alkali silicate solution preferably has a concentration of about 22–26° Baume (Bé). The mineral acid is preferably sulfuric acid. The acid preferably has a concentration of about 16–19° Bé. The silicate and acid are preferably combined in proportions to yield a mixture containing about 18–21 wt. % silica and a pH of about 6–10.

The silicate and the acid are preferably maintained at a relatively cool temperature prior to mixing. Preferably the temperature is kept at about 10–20° C. Since the mixture will tend to gel rapidly, in-line mixing techniques such as those described in U.S. Pat. No. 3,872,217 or Japanese Patent 48-13834 are preferably used to form the beads. The gelation preferably occurs within 3 seconds from when the mixture is formed, more preferably within 0.5 seconds.

The gelled beads are then collected as they fall in an aqueous bath. The bath preferably has a pH of about 2–6. Preferably, the bath contains sulfuric acid. The soak time in the bath is about 10–60 minutes. The beads are then washed in an acid wash (pH=3–6) for about 15–30 hours, preferably about 20 hours. The washed beads are then ammonia aged at pH of about 8–10 for about 5–25 hours, preferably about 6–20 hours. The end level of $Na_2O$ in the beads is preferably less than 0.1 wt. %, more preferably less than 0.05 wt. %.

The washed beads are then treated to remove the water from the pores. Preferably, water removal is accomplished by azeotropic distillation. Where the water is removed by azeotropic distillation, the hydrogel is simply combined with an organic solvent suitable for azeotropic distillation, such as hexanol. The distillation is preferably conducted at about 95° C.–170° C. The distillation is typically performed until all the water is removed from the gel. The resulting xerogel can then be dried and calcined to remove the organic solvent. Preferably, the drying is performed at 170–250° C.

The addition of chromium to the silica gel may be performed at one or more places in the above process. For example, the chromium can be added to the silica hydrogel before water removal using an aqueous solution of a chromium compound. The chromium can also be added during the azeotropic distillation. The chromium can also be added by post-impregnation of the calcined silica gel. The method of chromium addition is not believed to be critical to the results of the invention. Conventional chromium compounds such as chromium acetate, chromium acetyl acetonate or chromium nitrate may be used. The chromium-containing catalyst may be calcined as appropriate to achieve an activated catalyst.

The catalysts of the invention are believed to be suitable for a variety of polymerization reactions. The catalysts are especially useful for the production of polyethylene. The utility of the catalyst of the invention is not limited to any specific polymerization technique.

The invention is further illustrated by the examples below. It should be understood that the invention is not limited to the specific details of the examples.

EXAMPLE 1

A solution of sodium silicate (25° Bé@60° F.) and solution of sulfuric acid (17.5° Bé@60° F.) were cooled to below 60° F. (15° C.). The solutions were mixed in an in-line mixer and immediately ejected into the air to form beads. The mixture had a silica content of about 18 wt. % and a pH of about 9.0. In the process of exiting the mixer and falling through the air, the gelation occurs (typically about one second). The gelled beads were then caught in a bath having pH=4.0.

The beads were then transferred to a soaking tank where they were washed with dilute acid for 20 hours. The washed beads were then aged in an ammonium-containing solution (pH=8) at 140° F. for about 5 hours. The beads were then recovered and contacted with hexanol in a vessel connected to an azeotropic distillation apparatus. The hexanol-bead mixture was then heated to about 170° C. to remove the water from the beads by azeotropic distillation. The resulting beads were then vacuum dried at 150° C. and calcined at 1200° F. The calcined beads were then impregnated with a chromium acetate-alcohol-water mixture to place about 1 wt. % Cr on the silica gel. The Cr-containing silica was then dried and calcined. The resulting catalyst had a surface area of 307 $m^2/g$ and a pore volume of 2.22 cc/g, both measured by nitrogen BET method.

EXAMPLE 2

Silica gel beads were prepared in the same manner as in example 1 except that the chromium solution was added to the hexanol-bead mixture just prior to azeotropic distillation. The resulting catalyst had a surface area of 310 $m^2/g$ and a pore volume of 2.55 cc/g, both measured by nitrogen BET method.

EXAMPLE 3

The performance of the catalysts resulting from examples 1 and 2 was then tested.

About 30 cc of each catalyst were fluidized in a special quartz tube (4.5 cm in Diameter), which had a sintered frit to support the sample. The fluidizing medium (air) passed through beds containing activated alumina so that the moisture content corresponded to Dew Point of less than −100° F. This fluidized bed was heated at the rate of 400° C./hr to final temperatures indicated in Table I; 1500 and 1600° F. degrees Fahrenheit. This catalyst activating process continued for 5 hours at 1500° F. and 1600° F. At the end the given period, the quartz tube with the sample was cooled to ambient temperature and the activated catalyst was transferred to a glass container for storage. All handling of the activated material was done under nitrogen.

Evaluation of the activated catalysts for type of polyethylene produced during polymerization was done at either 103 or 109° C. in a two-liter stirred autoclave. The temperature was controlled and held constant to within 0.5° C. by adjusting the pressure of boiling methanol in the jacket surrounding the reactor. After the autoclave was filled with nitrogen and heated to about 102° C., about 0.05 gm of activated catalyst was transferred under nitrogen blanket into the autoclave, followed by about one liter of liquid isobutane. The isobutane was prepurified by passing it through beds containing activated charcoal and alumina. Stirring was started and ethylene was supplied on demand to maintain 550 psig. Under these conditions, the polyethylene produced does not dissolve in the isobutane, but remains in slurry form. The reaction was allowed to proceed at 109° C. until about 4000 grams of resin were made per gram of catalyst. All reactions were terminated by venting off isobutane and excess ethylene from the reactor.

All results and polymerization conditions are given in the attached table. The Melt Index of the final resin was determined using ASTM Proc. D1238-79, Cond. E, Procedure A for MI<1, and Procedure B for MI>1.

TABLE I

| Catalyst | Activation Temperature (° F.) | Catalyst Amount (g) | Melt Index |
|---|---|---|---|
| Ex. 1 | 1500 | 0.0469 | 5.1 |
| Ex. 1 | 1500 | 0.0531 | 4.6 |
| Ex. 2 | 1600 | 0.0347 | 5.9 |
| Ex. 2 | 1500 | 0.0305 | 5.4 |
| Ex. 2 | 1500 | 0.0605 | 5.9 |

What is claimed is:

1. A process for manufacture of a chromium-containing silica catalyst, said process comprising:
   (a) concurrently combining alkali metal silicate solution and mineral acid to form a mixture having pH of 6–10 and a silica content of about 16–21 wt. % and maintaining said mixture at a temperature of about 10–20° C.;
   (b) rapidly gelling said mixture into beads;
   (c) washing said beads in an aqueous bath at a pH in the range of about 3 to 6 for about 15 to 30 hours;
   (d) aging said beads in an alkaline bath having a pH of about 8–10 for about 5–25 hours;
   (e) immersing said aged beads in an organic solvent suitable for azeotropic distillation, and removing water from said beads by azeotropic distillation; and
   (f) drying said beads; provided that a chromium compound is added to the mixture to be gelled, or to said beads before or during step (e) or after step (f).

2. The process of claim 1 wherein said dried beads are activated by calcination.

3. The process of claim 1 wherein said beads are formed in step (b) by ejecting said mixture into air.

4. The process of claim 3 wherein said gelation takes place while said beads are in the air.

5. The process of claim 3 wherein said gelation takes place in about 0.5–3 seconds.

6. The process of claim 1 wherein said mixture is formed in step (a) using in-line mixing.

7. The process of claim 1 wherein said beads are aged in a solution of ammonium hydroxide.

8. The process of claim 1 wherein said organic solvent comprises an alcohol.

9. The process of claim 8 wherein said azeotropic distillation takes place at about 95–170° C.

10. The process of claim 1 wherein said alkali metal silicate comprises sodium silicate and said mineral acid comprises sulfuric acid.

11. The process of claim 1, 2, 3, 4, 5, 6, 7, 8, 9 or 10 wherein the beads formed in (b) are washed in the acidic bath (c) and then aged by contact with alkaline bath (d) prior to removal of water by azeotropic distillation (e).

12. The process of claim 1, 2, 3, 4, 5, 6, 7, 8, 9 or 10 further comprising retrieving said chromium containing silica catalyst of step(f) and contacting same with an olefin to cause polymerization thereof.

* * * * *